US012602766B2

(12) United States Patent
Duan et al.

(10) Patent No.: US 12,602,766 B2
(45) Date of Patent: Apr. 14, 2026

(54) METHOD, APPARATUS, DEVICE, MEDIUM AND PRODUCT FOR DETECTING ALIGNMENT OF BATTERY ELECTRODE PLATES

(71) Applicant: CONTEMPORARY AMPEREX TECHNOLOGY (HONG KONG) LIMITED, Hong Kong (CN)

(72) Inventors: Pengfei Duan, Ningde (CN); Hongyuan Li, Ningde (CN); Qian Wu, Ningde (CN); Dajun Ni, Ningde (CN); Canbin Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 364 days.

(21) Appl. No.: 18/364,711

(22) Filed: Aug. 3, 2023

(65) Prior Publication Data

US 2023/0377122 A1     Nov. 23, 2023

Related U.S. Application Data

(63) Continuation of application No. PCT/CN2022/086218, filed on Apr. 12, 2022.

(51) Int. Cl.
*G06K 9/00*          (2022.01)
*G06T 7/00*          (2017.01)
(Continued)

(52) U.S. Cl.
CPC ............ G06T 7/0006 (2013.01); G06T 7/564 (2017.01); H01M 10/0583 (2013.01); *G06T 2207/30136* (2013.01)

(58) Field of Classification Search
CPC ... G06T 7/50; G06T 7/70; G06T 2207/30108; G06T 2207/30204; G06T 2207/10028;
(Continued)

(56) References Cited

U.S. PATENT DOCUMENTS 10,957,944 B2 *  3/2021  Han ...................... G06T 7/0004
12,183,934 B2 * 12/2024  Ono .................. H01M 10/0585
(Continued)

FOREIGN PATENT DOCUMENTS

CN        105895963 A      8/2016
CN        207504112 U      6/2018
(Continued)

OTHER PUBLICATIONS

Extended European Search Report for EP application No. 22924559. 2, dated May 22, 2024.
(Continued)

*Primary Examiner* — Shervin K Nakhjavan
(74) *Attorney, Agent, or Firm* — Ladas & Parry LLP

(57)                ABSTRACT

A method, an apparatus, a device, a medium and a product for detecting alignment of battery electrode plates are provided. The method includes: obtaining depth distances of a target cross section of the battery electrode plates after lamination molding, wherein the target cross section is perpendicular to an electrode plate setting direction of the battery electrode plates, and the depth distances of the target cross section includes the depth distance corresponding to each of the electrode plates; and determining an alignment detection result of the battery electrode plates based on the depth distances of the target cross section. According to embodiments of the present application, the depth distances of the target cross section of the battery electrode plates can be obtained after lamination molding of the battery electrode plates, the depth distances of the target cross section may
(Continued)

include the corresponding depth distance of each electrode plate.

20 Claims, 4 Drawing Sheets

(51) Int. Cl.
      *G06T 7/564*          (2017.01)
      *H01M 10/0583*        (2010.01)
(58) Field of Classification Search
      CPC . G06T 2207/30141; G06T 2207/30148; G06T
            2207/30164; G06T 7/0006; G06T 7/564;
            G06T 2207/30136; G06F 1/263; H01M
            4/00; H01M 8/24; H01M 8/2404; H01M
            8/2459; H01M 8/2475; H01M 10/0413;
            H01M 10/0418; H01M 10/0468; H01M
            10/0404; H01M 10/0585; H01M 10/058;
            H01M 10/0583; G01B 11/272; G01B
                              11/0608; Y02E 60/10
      See application file for complete search history.

(56)                  References Cited

U.S. PATENT DOCUMENTS

| | | | | |
|---|---|---|---|---|
| 12,266,093 | B2 * | 4/2025 | Oh | G06T 7/62 |
| 2012/0308878 | A1 * | 12/2012 | Sakashita | H01M 50/147 |
| | | | | 429/185 |
| 2023/0006239 | A1 * | 1/2023 | Song | B32B 38/1833 |

FOREIGN PATENT DOCUMENTS

| | | | | | |
|---|---|---|---|---|---|
| CN | 108398084 | A | * | 8/2018 | ............ G01B 11/06 |
| CN | 111539943 | A | | 8/2020 | |
| CN | 112053326 | A | | 12/2020 | |
| CN | 112508838 | A | | 3/2021 | |
| CN | 112652802 | A | | 4/2021 | |
| CN | 113302777 | A | | 8/2021 | |
| CN | 113409282 | A | | 12/2024 | |
| KR | 102164658 | B1 | | 10/2020 | |
| KR | 20220031440 | A | | 3/2022 | |
| WO | 2022063080 | A1 | | 3/2022 | |

OTHER PUBLICATIONS

Ma Tangyi et al. "Application of Computed Tomography in Lithium-ion Battery Detection", Journal of Chongqing University of Technology (Natural Science), vol. 2, No. 34, Feb. 29, 2020, pp. 133-139 (with English Abstract).

Notice of registration, CN application No. 202280032326.5, dated Aug. 18, 2025.

International Search Report for International Application PCT/CN2022/086218, mailed Oct. 10, 2022.

T. Ma et al. "Application of Computed Tomography in Lithium-ion Battery Detection", Journal of Chongqing University of Technology (Natural Science), vol. 34 No. 2, Feb. 29, 2020, pp. 133-139 (with English abstract).

* cited by examiner

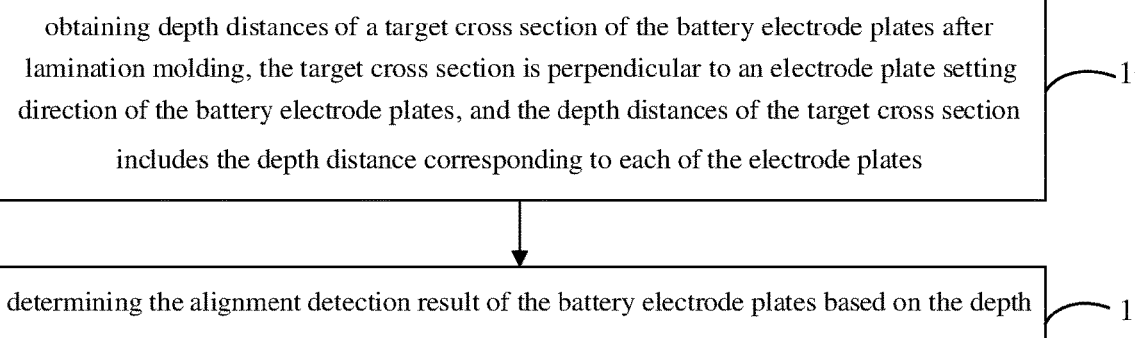

obtaining depth distances of a target cross section of the battery electrode plates after lamination molding, the target cross section is perpendicular to an electrode plate setting direction of the battery electrode plates, and the depth distances of the target cross section includes the depth distance corresponding to each of the electrode plates ~101 determining the alignment detection result of the battery electrode plates based on the depth distances of the target cross section ~102

FIG. 1

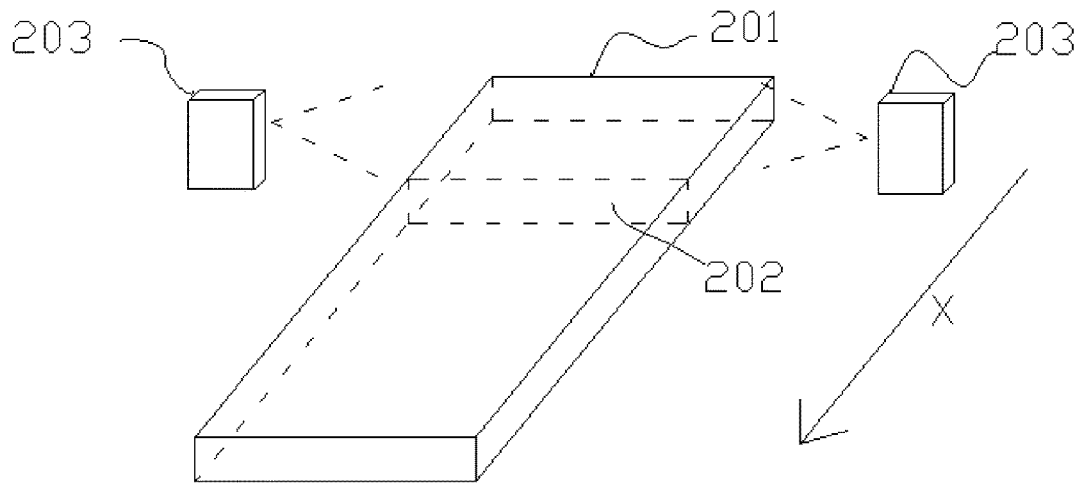

Apparatus for detecting
alignment of battery electrode
plates

Obtaining module — 701

Detection module — 702

┌─801          ┌─802                ┌─803
Processor      Memory          Communication
                               interface Bus ─ 804

METHOD, APPARATUS, DEVICE, MEDIUM AND PRODUCT FOR DETECTING ALIGNMENT OF BATTERY ELECTRODE PLATES

CROSS REFERENCE TO RELATED APPLICATION

This application is a continuation of International Patent Application No. PCT/CN2022/086218, filed on Apr. 12, 2022, which is incorporated by reference in its entirety.

TECHNICAL FIELD

The present application relates to the field of battery detection technology, and in particular, to a method, an apparatus, a device, a medium and a product for detecting alignment of battery electrode plates.

BACKGROUND

Generally, a battery can be manufactured by winding and lamination processes. The lamination process may include Z-shaped lamination process, which realizes the process of lamination and isolation film coating electrode plates through the left and right movement of a lamination table. In order to ensure the safety performance of a laminated battery, it is often necessary to detect the alignment between its positive and negative electrode plates.

In the related technology, the alignment detection of the electrode plates is usually carried out in the process of lamination, and there is a lack of a method for overall detection of the alignment of the battery electrode plates after lamination molding, which leads to the difficulty of ensuring the overall alignment of the battery electrode plates after the lamination is completed, and further affects the quality of the battery.

SUMMARY

Embodiments of the present application provide a method, an apparatus, a device, a medium and a product for detecting alignment of battery electrode plates to solve the technical problem that it is often difficult to ensure the overall alignment of the battery electrode plates after lamination molding, which further affects the quality of the battery.

In a first aspect, the present application provides a method for detecting alignment of battery electrode plates, comprising:

obtaining depth distances of a target cross section of the battery electrode plates after lamination molding, wherein the target cross section is perpendicular to an electrode plate setting direction of the battery electrode plates, and the depth distances of the target cross section includes the depth distance corresponding to each of the electrode plates; and determining an alignment detection result of the battery electrode plates based on the depth distances of the target cross section.

In this way, the depth distances of the target cross section of the battery electrode plates can be obtained after lamination molding of the battery electrode plates. Since the target cross section is perpendicular to the electrode plate setting direction of the battery electrode plates, the target cross section includes each of the battery electrode plates. The depth distances of the target cross section may include the corresponding depth distance of each electrode plate. According to the corresponding depth distance of each electrode plate, the overall alignment of the battery electrode plates after lamination molding can be determined. The battery electrode plates qualified in the detection may be used to perform a subsequent manufacturing process, and the battery electrode plates unqualified in the detection can be treated by waste discharge, so as to ensure the quality of the battery and improve the good product rate of the battery.

In some embodiments, determining the alignment detection result of the battery electrode plates based on the depth distances of the target cross section includes:

based on the depth distances of N mark points included in the target cross section, determining peak points and trough points among the N mark points to obtain P peak points and Q trough points, wherein the N mark points correspond to N electrode plates one to one, wherein N is an integer greater than 1, and P and Q are both positive integers; and determining the alignment detection result of the battery electrode plates based on position information of the P peak points and the Q trough points.

In this embodiment, the peak points and the trough points among the battery electrode plates can be determined based on the depth distances of the N mark points, and then the arrangement and setting of each of the battery electrode plates can be reflected more intuitively according to the position information of the peak points and the trough points, thus the alignment detection result of the battery electrode plates can be determined more quickly and accurately.

In some embodiments, determining the peak points and the trough points among the N mark points to obtain the P peak points and the Q trough points based on the depth distances of the N mark points included in the target cross section includes:

dividing the target cross section into M regions, wherein each of the M regions includes a mark point corresponding to at least one positive electrode plate and a mark point corresponding to at least one negative electrode plate, respectively; and determining the peak point and the trough point in each of the M regions to obtain the P peak points and the Q trough points based on the depth distances of the mark points in each of the M regions.

In this embodiment, by dividing the target cross section into M regions, determining the peak point and the trough point in each region, and then summarizing the peak points and the trough points in the M regions, to obtain the P peak points and the Q trough points of the battery electrode plates. On the one hand, region division can reduce the number of mark points in each region, which effectively reduces the difficulty of determining the peak points and trough points, and thus improving the efficiency of determining the peak points and trough points among the battery electrode plates. On the other hand, the region division can improve the influence of inclination of the battery electrode plate on the determination of the peak points and the trough points, more accurately determine the peak points and the trough points among the N mark points of the target cross section, and then ensure the accuracy of the subsequent alignment detection result of the battery electrode plates.

In some embodiments, after determining the peak points and the trough points among the N mark points to obtain the P peak points and the Q trough points based on the depth distances of the N mark points included in the target cross section, the method further includes:

determining a target peak point and a target trough point whose depth distance meets a preset depth condition among the P peak points and the Q trough points;

wherein determining the alignment detection result of the battery electrode plates based on the position information of the P peak points and the Q trough points includes:

determining the alignment detection result of the battery electrode plates based on position information of the target peak point and the target trough point.

In this embodiment, the abnormal points among the P peak points and the Q trough points can be filtered out first, and the alignment detection result of the battery electrode plates can be determined based on the position information of the target peak point and the target trough point obtained after filtering, which can further improve the accuracy of the alignment detection result of the battery electrode plates.

In some embodiments, determining the target peak point and the target trough point whose depth distances meet the preset depth condition among the P peak points and the Q trough points includes:

determining the target peak point among the P peak points, the depth distance of the target peak point is in a first depth distance interval; and determining the target trough point among the Q trough points, the depth distance of the target trough point is in a second depth distance interval, a minimum value of the second depth distance interval is greater than a maximum value of the first depth distance interval.

In this embodiment, the abnormal peak points among the P peak points and the abnormal trough points among the Q trough points can be filtered out respectively, thereby ensuring the accuracy of filtering the abnormal points, and more accurate target peak point and target trough point can be obtained, so that when the alignment detection result of the battery electrode plates is determined based on the position information of the target peak point and the target trough point, the accuracy can be further improved.

In some embodiments, determining the alignment detection result of the battery electrode plates based on the position information of the P peak points and the Q trough points includes:

determining whether the P peak points and the Q trough points are arranged according to a preset rule based on the position information of the P peak points and the Q trough points; and determining that the alignment detection result of the battery electrode plates is qualified under a condition that the P peak points and the Q trough points are arranged according to the preset rule.

In this embodiment, the alignment detection result of the battery electrode plates can be determined more intuitively and quickly based on whether the P peak points and the Q trough points are arranged according to the preset rule, which effectively improves the efficiency of the alignment detection while ensuring the accuracy.

In some embodiments, determining that the alignment detection result of the battery electrode plates is qualified under the condition that the P peak points and the Q trough points are arranged according to the preset rule includes:

under the condition that the P peak points and the Q trough points are arranged according to the preset rule, determining whether the P peak points and the Q trough points meet a preset offset condition based on the depth distances of the P peak points and the Q trough points, and under a condition that the P peak points and the Q trough points meet the preset offset condition, determining that the alignment detection result of the battery electrode plates is qualified.

In this embodiment, the alignment detection result of the battery electrode plates can be determined from two dimensions, one is to consider the safety performance of the battery electrode plates to determine whether the positive electrode plate completely covers the negative electrode plates; and the other is to consider the electrical performance of the battery electrode plates based on the uniformity of the positive and negative plates, which further improves the accuracy of the alignment detection result, so that the good product rate of the battery manufactured subsequently based on the qualified battery electrode plates is higher.

In some embodiments, under the condition that the P peak points and the Q trough points are arranged according to the preset rule, determining whether the P peak points and the Q trough points meet the preset offset condition based on the depth distances of the P peak points and the Q trough points includes:

under the condition that the P peak points and the Q trough points are arranged according to the preset rule, obtaining an offset amount of the depth distances between the mark point corresponding to an i-th electrode plate and the mark point corresponding to a (i+1)th electrode plate, wherein i is a positive integer; and under a condition that the offset amount is in a preset offset interval, determining that the P peaks points and the Q trough points meet the preset offset condition.

In this embodiment, by determining whether the offset amount of the depth distances between the mark point corresponding to the i-th electrode plate in the battery electrode plates and the mark point corresponding to the (i+1)th electrode plate is in the preset offset interval respectively, and then determining whether the P peak points and Q trough points meet the preset offset condition, the uniformity factor of the positive and negative electrode plates can be more fully considered, and the accuracy of the alignment detection result can be further improved, therefore, the good product rate of the battery manufactured subsequently based on the qualified battery electrode plates is higher.

In some embodiments, before determining the alignment detection result of the battery electrode plates based on the position information of the P peak points and the Q trough points, the method further includes:

obtaining a peak line by fitting based on the position information of the P peak points;

calculating an inclination amount of the battery electrode plates based on the peak line;

under the condition that the P peak points and the Q trough points are arranged according to the preset rule, determining that the alignment detection result of the battery electrode plates is qualified includes:

under a condition that the inclination amount is less than or equal to a preset threshold, and the P peak points and the Q trough points are arranged according to the preset rule, determining that the alignment detection result of the battery electrode plates is qualified.

In this embodiment, the alignment detection result of the battery electrode plates can be determined from the two dimensions including the overall inclination of the battery electrode plates and whether the positive electrode plate completely covers the negative electrode plates, which can further improve the accuracy of the alignment detection result, thus the good product rate of the battery manufactured subsequently based on the qualified battery electrode plates is higher.

In some embodiments, obtaining the depth distances of the target cross section of the battery electrode plates after lamination molding includes:

under a condition that lamination completion information of the battery electrode plates is received, controlling a photographing device to move along a first direction, and taking an image of the battery electrode plates, the first direction is parallel to the electrode plate setting direction of the battery electrode plates; and determining the depth distance of the target cross section of the battery electrode plates based on the image.

In this embodiment, when the lamination completion information of the battery electrode plates is received, the photographing device can be controlled to capture the image of the battery electrode plates, and the depth distances of the target cross section of the battery electrode plates can be obtained, and then the alignment of the battery electrode plates can be detected according to the depth distances of the target cross section. The automation of the alignment detection of the battery electrode plates after lamination molding is realized, the detection process is simplified, and the detection efficiency is effectively improved.

In a second aspect, the present application provides an apparatus for detecting alignment of battery electrode plates, including:

an obtaining module for obtaining depth distances of a target cross section of the battery electrode plates after lamination molding, wherein the target cross section is perpendicular to an electrode plate setting direction of the battery electrode plates, and the depth distances of the target cross section includes the depth distance corresponding to each of the electrode plates; and a detection module for determining an alignment detection result of the battery electrode plates based on the depth distances of the target cross section.

In this embodiment, the apparatus for detecting alignment of battery electrode plates may obtain the depth distances of the target cross section of the battery electrode plates after lamination molding of the battery electrode plates. Since the target cross section is perpendicular to the electrode plate setting direction of the battery electrode plates, the target cross section includes each of the battery electrode plates. The depth distances of the target cross section may include the corresponding depth distance of each electrode plate. According to the corresponding depth distance of each electrode plate, the overall alignment of the battery electrode plates after lamination molding can be determined. The battery electrode plate qualified in the detection may be used to perform a subsequent manufacturing process, and the battery electrode plate failed in the detection can be treated by waste discharge, so as to ensure the quality of the battery and improve the good product rate of batteries.

In some embodiments, the detection module includes:

a first determination unit for based on the depth distances of N mark points included in the target cross section, determining peak points and trough points among the N mark points to obtain P peak points and Q trough points, wherein the N mark points correspond to N electrode plates one to one, wherein N is an integer greater than 1, and P and Q are both positive integers; and a second determination unit for determining the alignment detection result of the battery electrode plates based on position information of the P peak points and the Q trough points.

In this embodiment, the peak points and the trough points among the battery electrode plates can be determined based on the depth distances of the N mark points, and then the arrangement and setting of each of the battery electrode plates can be reflected more intuitively according to the position information of the peak points and the trough points, thus the alignment detection result of the battery electrode plates can be determined more quickly and accurately.

In some embodiments, the first determination unit is further for:

dividing the target cross section into M regions, wherein each of the M regions includes a mark point corresponding to at least one positive electrode plate and a mark point corresponding to at least one negative electrode plate, respectively; and determining the peak point and the trough point in each of the M regions to obtain the P peak points and the Q trough points based on the depth distances of the mark points in each of the M regions.

In this embodiment, by dividing the target cross section into M regions, determining the peak point and the trough point in each region, and then summarizing the peak points and the trough points in the M regions, to obtain the P peak points and the Q trough points of the battery electrode plates. On the one hand, region division can reduce the number of mark points in each region, which effectively reduces the difficulty of determining the peak points and trough points, and thus improving the efficiency of determining the peak points and trough points among the battery electrode plates. On the other hand, the region division can improve the influence of inclination of the battery electrode plate on the determination of the peak points and the trough points, more accurately determine the peak points and the trough points among the N mark points of the target cross section, and then ensure the accuracy of the subsequent alignment detection result of the battery electrode plates.

In some embodiments, the apparatus for detecting alignment of battery electrode plates, further includes:

a determination module for determining a target peak point and a target trough point whose depth distances meet a preset depth condition among the P peak points and the Q trough points;

the second determination unit is further for determining the alignment detection result of the battery electrode plates based on position information of the target peak point and the target trough point.

In this embodiment, the abnormal points among the P peak points and the Q trough points can be filtered out first, and the alignment detection result of the battery electrode plates can be determined based on the position information of the target peak point and the target trough point obtained after filtering, which can further improve the accuracy of the alignment detection result of the battery electrode plates.

In some embodiments, the determination module is further for:

determining the target peak point among the P peak points, the depth distance of the target peak point is in a first depth distance interval; and determining the target trough point among the Q trough points, the depth distance of the target trough point is in a second depth distance interval, a minimum value of the second depth distance interval is greater than a maximum value of the first depth distance interval.

In this embodiment, the abnormal peak points among the P peak points and the abnormal trough points among the Q trough points can be filtered out respectively, thereby ensuring the accuracy of filtering the abnormal points, and more accurate target peak points and target trough points can be obtained, so that when the alignment detection result of the battery electrode plates is determined based on the position information of the target peak points and the target trough points, the accuracy can be further improved.

In some embodiments, the second determination unit includes:

a first determination subunit for determining whether the P peak points and the Q trough points are arranged according to a preset rule based on the position information of the P peak points and the Q trough points, a second determination subunit for determining that the alignment detection result of the battery electrode plates is qualified under a condition that the P peak points and the Q trough points are arranged according to the preset rule.

In this embodiment, the alignment detection result of the battery electrode plates can be determined more intuitively and quickly based on whether the P peak points and the Q trough points are arranged according to the preset rule, which effectively improves the efficiency of the alignment detection while ensuring the accuracy.

In some embodiments, the second determination subunit is further for:

under the condition that the P peak points and the Q trough points are arranged according to the preset rule, determining whether the P peak points and the Q trough points meet a preset offset condition based on the depth distances of the P peak points and the Q trough points, under a condition that the P peak points and the Q trough points meet the preset offset condition, determining that the alignment detection result of the battery electrode plates is qualified.

In this embodiment, the alignment detection result of the battery electrode plates can be determined from two dimensions, one is to consider the safety performance of the battery electrode plates to determine whether the positive electrode plate completely covers the negative electrode plates; and the other is to consider the electrical performance of the battery electrode plates based on the uniformity of the positive and negative plates, which further improves the accuracy of the alignment detection result, so that the good product rate of the battery manufactured subsequently based on the qualified battery electrode plates is higher.

In some embodiments, the second determination subunit is further for:

under the condition that the P peak points and the Q trough points are arranged according to the preset rule, obtaining an offset amount of the depth distances between the mark point corresponding to an $i$-th electrode plate and the mark point corresponding to a $(i+1)$th electrode plate, wherein $i$ is a positive integer;

under a condition that the offset amount is in a preset offset interval, determining that the P peaks points and the Q trough points meet the preset offset condition.

In this embodiment, by determining whether the offset amount of the depth distances between the mark point corresponding to the $i$-th electrode plate in the battery electrode plates and the mark point corresponding to the $(i+1)$th electrode plate is in the preset offset interval respectively, and then determining whether the P peak points and the Q trough points meet the preset offset condition, the uniformity factor of the positive and negative plates can be more fully considered, and the accuracy of the alignment detection result can be further improved, therefore, the good product rate of the battery manufactured subsequently based on the qualified battery electrode plates is higher.

In some embodiments, the apparatus for detecting alignment of battery electrode plates further includes:

a fitting module for obtaining a peak line by fitting based on the position information of the P peak points;

a calculation module for calculating an inclination amount of the battery electrode plates based on the peak line;

the second determination subunit is further for:

under a condition that the inclination amount is less than or equal to a preset threshold, and the P peak points and the Q trough points are arranged according to the preset rule, determining that the alignment detection result of the battery electrode plates is qualified.

In this embodiment, the alignment detection result of the battery electrode plates can be determined from the two dimensions including the overall inclination of the battery electrode plates and whether the positive electrode plate completely covers the negative electrode plates, which can further improve the accuracy of the alignment detection result, thus the good product rate of the battery manufactured subsequently based on the qualified battery electrode plates is higher.

In some embodiments, the obtaining module is further for:

under a condition that lamination completion information of the battery electrode plates is received, controlling a photographing device to move along a first direction, and taking an image of the battery electrode plates, the first direction is parallel to the electrode plate setting direction of the battery electrode plates;

determining the depth distances of the target cross section of the battery electrode plates based on the image.

In this embodiment, when the lamination completion information of the battery electrode plates is received, the photographing device can be controlled to capture the image of the battery electrode plates, and the depth distances of the target cross section of the battery electrode plates can be obtained, and then the alignment of the battery electrode plates can be detected according to the depth distances of the target cross section. The automation of the alignment detection of the battery electrode plates after lamination molding is realized, the detection process is simplified, and detection efficiency is effectively improved.

In a third aspect, embodiments of the present application provide an electronic device comprising a processor and a memory storing programs or instructions;

wherein the processor, when executes the programs or instructions, implements the method described above.

In a fourth aspect, embodiments of the present application provide a readable storage medium having programs or instructions stored thereon, wherein the programs or instructions, when executed by a processor, implements the method described above.

In a fifth aspect, embodiments of the present application provide a computer program product, wherein instructions in the computer program product, when executed by a processor of an electronic device, cause the electronic device to perform the method described above.

The above description is only an overview of the technical solution of the present application. In order to have a better understanding of the technical means of the present application, the technical means can be implemented in accordance with the contents of the specification, and in order to make the above and other purposes, features and advantages of the present application more obvious and easier to understand, the following highlights the specific implementation of this application. The detailed description of the present application are listed below.

BRIEF DESCRIPTION OF THE DRAWINGS

In order to more clearly illustrate the technical solutions of the embodiments of the present application, the drawings to be used in the embodiments of the present application will be briefly described below. Obviously, the drawings described below are merely some embodiments of the present application, and for those of ordinary skill in the art, other drawings can be obtained based on these drawings without inventive effort.

FIG. 1 is a flow schematic diagram of a method for detecting alignment of battery electrode plates provided by one embodiment of the present application.

FIG. 2 is a structure schematic diagram of the battery electrode plates provided by the embodiment of the present application.

DETAILED DESCRIPTION

Figure 3:
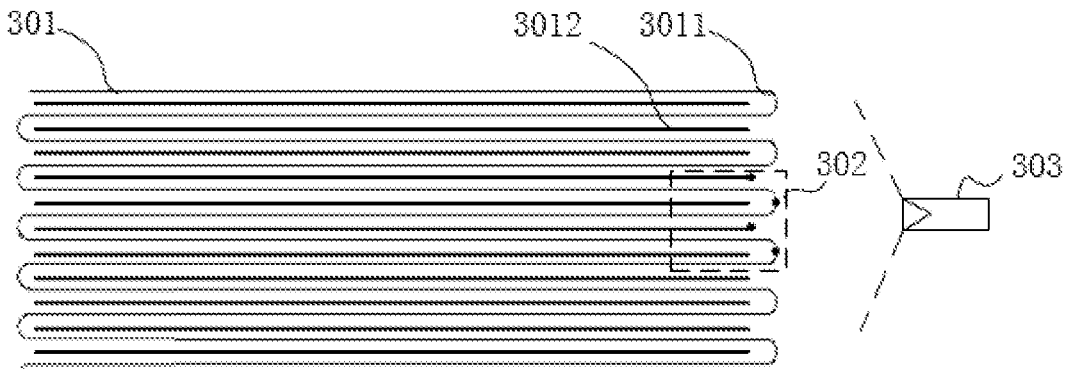
FIG. 3 is a structure schematic diagram of the target cross section in the method for detecting alignment of battery electrode plates provided by the embodiment of the present application.

Implementation of the present application are described in further detail below with reference to the drawings and embodiments. The detailed description and drawings of the following embodiments are used to exemplarily illustrate the principle of the present application, but should not be used to limit the scope of the present application, that is, the present application is not limited to the described embodiments.

In the description of the present application, it should be noted that, unless otherwise stated, "a plurality of" means two or more; an orientation or location relationship indicated by terms "upper", "lower", "left", "right", "inside" and "outside" or the like is used only for conveniently describing the application and simplifying the description, rather than indicating or implying that the involved devices or elements must have a specific orientation, must be constructed or operated in a specific orientation, and therefore cannot be construed as a limitation of the application. Further, terms "first", "second", "third" or the like are used only for descriptive purposes, and should not be construed to indicate or imply relative importance. The word "vertical" does not indicate vertical to a strict extent, but allow a certain range of errors. The word "parallel" does not indicate parallel to a strict extent, but allow a certain range of errors.

All of the terms about orientations appearing in the following description indicate directions shown in the figures, and do not limit specific structures in the present application. In the description of the present application, it should also be noted that, unless otherwise clearly defined and stated, terms "install", "connect" and "connection" should be construed in a broad sense, for example, it may be a fixed connection, or a removable connection, or an integral connection; and it may be a direct connection, or an indirect connection through an intermediate medium. For those skilled in the art, specific meaning of the above-mentioned terms in the present application should be construed according to specific circumstances.

The battery cell includes battery electrode plates and electrolyte, and the battery electrode plates include a positive electrode plate, a negative electrode plate, and an isolation film. The battery cell mainly relies on metal ions moving between the positive electrode plate and negative electrode plate to function. The positive electrode plate includes a positive current collector and a positive active material layer. The positive active material layer is coated on a surface of the positive current collector, and a part of the positive current collector without the positive active material layer protrudes from a part of the positive current collector with the positive active material layer, and the part of the positive current collector without the positive active material layer is used as a positive tab. Taking a lithium-ion battery cell as an example, the positive current collector may be made of aluminum, and the positive active material may be lithium cobalt oxide, lithium iron phosphate, ternary lithium or lithium manganese oxide. The negative electrode plate includes a negative current collector and a negative active material layer. The negative active material layer is coated on a surface of the negative current collector, a part of the negative current collector without the negative active material layer protrudes from a part of the negative current collector with the negative active material layer, and the part of the negative current collector without the negative active material layer is used as a negative tab. The negative current collector may be made of copper, and the negative active material may be carbon or silicon. The isolation film may be made of PP (polypropylene) or PE (polyethylene), etc. In addition, the battery electrode plates may be a wound structure or a laminated structure, and the battery electrode plates in embodiments of the present application may be a Z-shaped laminated structure.

It is understandable that in order to ensure the safety performance of the battery electrode plates, it is often necessary to detect the alignment among the positive and negative electrode plates to ensure that the negative and positive electrode plates are in a staggered arrangement, and the positive electrode plate completely covers the negative electrode plates. Both sides of the positive electrode plate in the embodiments of the present application are provided with the isolation film which completely covers the positive electrode plate. In the Z-shaped lamination process, the lamination table moves left and right so that the positive electrode plate is folded in a Z-shape, and the negative electrode plates are arranged in the Z-shaped structure of the positive electrode plate, so that the positive and negative plates are in a staggered arrangement.

In the related technologies, images can be continuously taken in the process of lamination, and edge lines of the negative electrode plate, the positive electrode plate, the isolation film and a reference object can be extracted from the images. Based on the edge line of the reference object, the relative distance between the edge line of the negative electrode plate and the edge line of the positive electrode plate is obtained, and then the alignment between the negative electrode plate and the positive electrode plate is detected. It can be seen that in the related technologies, the alignment of the electrode plates is usually detected during the process of lamination, but there is a lack of a method to detect the alignment of the battery electrode plates after lamination molding, which leads to the overall alignment of the battery electrode plates often difficult to be guaranteed after completion of the lamination, thus affecting the quality of the battery.

Based on the above problems, embodiments of the present application provides a method, an apparatus, a device, a medium and a product for detecting alignment of battery electrode plates, which can detect the alignment of the battery electrode plates after lamination molding. First of all, the method for detecting alignment of battery electrode plates provided by the embodiment of the present application is introduced.

Please refer to FIG. 1, which is a flow schematic diagram of a method for detecting alignment of battery electrode plates provided by one embodiment of the present application, the method for detecting alignment of battery electrode plates may include the following steps.

In Step 101, obtaining depth distances of a target cross section of the battery electrode plates after lamination molding, the target cross section is perpendicular to an electrode plate setting direction of the battery electrode plates, and the depth distances of the target cross section includes the depth distance corresponding to each of the electrode plates.

In step 102, determining an alignment detection result of the battery electrode plates based on the depth distances of the target cross section.

In this way, the depth distances of the target cross section of the battery electrode plates can be obtained after lamination molding of the battery electrode plates. Since the target cross section is perpendicular to the electrode plate setting direction of the battery electrode plates, the target cross section includes each of the battery electrode plates. The depth distances of the target cross section may include the corresponding depth distance of each electrode plate. According to the corresponding depth distance of each electrode plate, the overall alignment of the battery electrode plates after lamination molding can be determined. The battery electrode plates qualified in the detection may be used to perform a subsequent manufacturing process, and the battery electrode plates unqualified in the detection can be treated by waste discharge, so as to ensure the quality of the battery and improve the good product rate of the battery.

In step 101, as shown in FIG. 2, the target cross section 202 of the battery electrode plates 201 is perpendicular to the electrode plate setting direction of the battery electrode plates 201, wherein the target cross section 202 may include the cross sections of all positive and negative plates among the entire battery electrode plates 201.

The depth distances of the target cross section 202 of the laminated battery electrode plates 201 can be obtained based on the sensor 203 photographing or scanning the side of the battery electrode plates 201 along the first direction (X), and the first direction (X) may be parallel to the electrode plate setting direction. The depth distances of the target cross section 202 may refer to the distance between each electrode plate at the target cross section 202 and the sensor.

The sensor can include a device that can collect the depth distance of a measured object, such as a single-line lidar, a double-line lidar and a depth camera, which is not specifically limited here.

In step 102, the alignment detection result of the battery electrode plates can be determined based on the depth distances of the target cross section. It should be understood that when the positive electrode plate among the battery electrode plates completely covers the negative electrode plate, the depth distance of the positive electrode plate in the battery electrode plate is less than that of the negative electrode plate. Based on this, according to the distance between each electrode plate and the sensor at the target cross section, whether the positive electrode plate completely covers the negative electrode plate can be determined, and then the overall alignment of the battery electrode plates can be detected to ensure the safety performance of the battery electrode plates.

For example, if the depth distances of odd electrode plates are in a first interval, and the depth distances of even electrode plates are in a second interval, and the value range of the first interval is different from that of the second interval, it is believed that that there is a covered relationship between the positive electrode plates and the negative electrode plates, then it can be determined that the alignment detection result of the battery electrode plates is qualified. If the depth distances of any two adjacent electrode plates are all in the first interval or the second interval, it is believed that the positive electrode plate doesn't completely cover the negative electrode plates, then it can be determined that the alignment detection result of the battery electrode plates is unqualified.

In some examples, the number of the target cross sections can be 1, that is, the alignment of the battery electrode plates can be detected according to the depth distance of any one cross section perpendicular to the setting direction of the battery electrode plates. In order to improve the accuracy of the detection result, the number of target cross sections can also be multiple, and the alignment detection result of the battery electrode plates can be jointly determined according to the depth distances of the multiple target cross sections. In the case that all the depth distances of each target cross section indicate the positive electrode plate completely covers the negative electrode plates, it is determined that the alignment detection result of the battery electrode plates is qualified.

For example, the depth distances of N target cross sections of the battery electrode plates after lamination molding can be obtained, wherein N is an integer greater than 1. According to the depth distances of N target cross sections, N detection results corresponding to the N target cross sections one to one are determined, and if all the N detection results are qualified, the alignment detection result of the battery electrode plates is qualified.

For example, the depth distances of three target cross sections for two sides and a middle position of the battery electrode plates can be obtained respectively, and if the corresponding detection results of the three target cross sections are all qualified, the alignment detection result of the battery electrode plates can be considered to be qualified. In this way, the influence of the position deviation of the electrode plate during the lamination process on the alignment detection result can be avoided, thus the accuracy of the alignment detection result of the battery electrode plates can be improved.

In some embodiments, the above step 102 may include the following steps:

based on the depth distances of N mark points included in the target cross section, determining peak points and trough points among the N mark points to obtain P peak points and Q trough points, wherein the N mark points correspond to N electrode plates one to one, wherein N is an integer greater than 1, and P and Q are both positive integers; and determining the alignment detection result of the battery electrode plates based on position information of the P peak points and the Q trough points.

As shown in FIG. 3, the battery electrode plates 301 may include a positive electrode plate 3011 and a negative electrode plate 3012, wherein the positive electrode plate 3011 has a continuous Z-shaped structure and the negative electrode plate 3012 is arranged in the Z-shaped positive electrode plate 3011. In the present embodiment, taking the side of the battery electrode plates 301 collected by the sensor 303 as an example, the positive electrode plate between two adjacent negative electrode plates 3012 can be taken as a positive electrode plate, and each electrode plate may correspond to a mark point, that is, the distance between the mark point and the sensor 303 can be determined as the distance between the electrode plate corresponding to the mark point and the sensor 303.

According to the depth distances of the N mark points included in the target cross section, the peak points and the trough points among the N mark points can be determined to obtain the P peak points and the Q trough points. It is understandable that, as shown in FIG. 3, for the battery electrode plates 301, the mark point corresponding to the positive electrode plate 3011 may be the peak point, while the mark point corresponding to the negative electrode plate 3012 may be the trough point, in other words, the mark point whose depth distance is less than a preset threshold can be determined as the peak point, and the mark point whose depth distance is greater than the preset threshold may be determined as the trough point. The preset threshold can be determined according to the depth distances of the N mark points, for example, the preset threshold can be the average value of the depth distances of the N mark points, and preset threshold can also be set based on an empirical value in connection with actual situations, which is not specifically limited here.

After the P peak points and the Q trough points are obtained, the alignment detection result of the battery electrode plates can be determined according to the position information of the P peak points and the Q trough points. It is understandable that the positive and negative electrode plates in qualified battery electrode plates are arranged in a staggered way, and the positive electrode plates completely cover the negative electrode plates. Therefore, according to the position information of the P peak points and the Q trough points, it is possible to determine whether the P peak points and the Q trough points are arranged in a staggered way. If so, it is believed that that the alignment detection result of the battery electrode plates is qualified, if not, it is believed that that alignment detection result of the battery electrode plates is not qualified.

In this embodiment, the peak points and the trough points among the battery electrode plates can be determined based on the depth distances of the N mark points, and then the arrangement and setting of each of the battery electrode plates can be reflected more intuitively according to the position information of the peak points and the trough points, thus the alignment detection result of the battery electrode plates can be determined more quickly and accurately.

Figure 4:
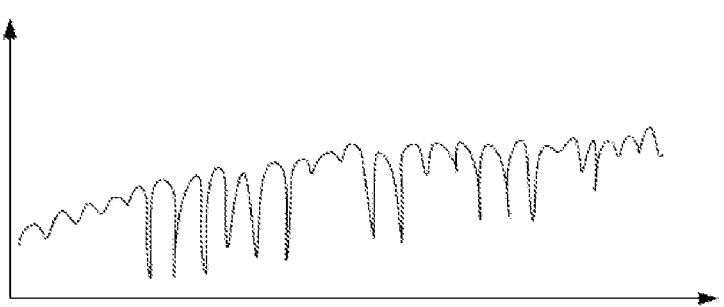
FIG. 4 is a schematic diagram of a peak-trough curve in the method for detecting alignment of battery electrode plates provided by the embodiment of the present application.

In some examples, the alignment detection result of the battery electrode plates is determined according to the position information of the P peak points and the Q trough points. A peak-trough curve as shown in FIG. 4 can be generated according to the position information of the P peak points and the Q trough points. The curve can be inputted into a pre-trained detection model, and the alignment detection result of the battery electrode plates can be obtained from output of the detection model.

The detection model can be obtained by deep learning and training based on a historical peak-trough curve and a historical detection result. The historical peak-trough curve may be generated based on the position information of the corresponding peak and trough points of historical battery electrode plates, and the historical detection result can be the alignment detection result obtained by manual detection for the historical battery electrode plates. In this way, through the pre-trained detection model to detect the alignment of the battery electrode plates, the detection efficiency can be effectively improved.

In some embodiments, determining the peak points and the trough points among the N mark points to obtain the P peak points and the Q trough points based on the depth distances of the N mark points included in the target cross section described above may include the following steps:

dividing the target cross section into M regions, wherein each of the M regions includes a mark point corresponding to at least one positive electrode plate and a mark point corresponding to at least one negative electrode plate, respectively; and determining the peak point and the trough point in each of the M regions to obtain the P peak points and the Q trough points based on the depth distances of the mark points in each of the M regions.

It should be understood that in the process of lamination, there may be a certain deviation in the position of the electrode plate, which may result in a certain inclination of the battery electrode plate. In this case, in order to ensure that the peak points and the trough points can be accurately determined from the N mark points of the target cross section, the target cross section may be divided into M regions, each of which may include a mark point corresponding to at least one positive electrode plate and a mark point corresponding to at least one negative electrode plate, respectively.

For example, the thickness and the number of layers of the battery electrode plates can be used as a reference to divide the target cross section into M regions. For example, the thickness of the battery electrode plates can be 50 mm, and the number of layers of the electrode plates can be 50. The target cross section can be divided into 10 regions by taking 5 mm as one region, and each region includes the mark points corresponding to the positive and negative electrode plates.

As shown in FIG. 3, the peak point and trough point in each region 302 can be determined according to the depth distances of the mark points in each region 302. As an example the peak point in the region 302 may be determined first and then the trough point adjacent to the peak point in the region 302 may be located according to the peak point. It is understandable that the trough point in the region 302 can also be determined first and then the peak point adjacent to the trough point in the region 302 can be located according to the trough point.

After the peak point and trough point in each region are obtained, all the peak points in the M regions can be determined as the P peak points of the battery electrode plates, and all trough points in the M regions can be determined as the Q trough points of the battery electrode plates.

In this embodiment, by dividing the target cross section into M regions, determining the peak point and the trough point in each region, and then summarizing the peak points and the trough points in the M regions, to obtain the P peak points and the Q trough points of the battery electrode plates. On the one hand, region division can reduce the number of mark points in each region, which effectively reduces the difficulty of determining the peak points and the trough points, and thus improving the efficiency of determining the peak points and trough points among the battery electrode plates. On the other hand, the region division can improve the influence of inclination of the battery electrode plate on determination of the peak points and the trough points, more accurately determine the peak points and the trough points among the N mark points of the target cross section, and then ensure the accuracy of the subsequent alignment detection result of the battery electrode plates.

In some embodiments, after determining the peak points and the trough points among the N mark points to obtain the P peak points and the Q trough points based on the depth distances of the N mark points included in the target cross section, the method for detecting alignment of battery electrode plates may further include the following steps:

determining a target peak point and a target trough point whose depth distances meet a preset depth condition among the P peak points and the Q trough points;

determining the alignment detection result of the battery electrode plates based on the position information of the P peak points and the Q trough points described above may include the following step:

determining the alignment detection result of the battery electrode plates based on position information of the target peak point and the target trough point.

In the present embodiment, after the P peaks and the Q troughs are obtained, the target peak point and the target trough point whose depth distances meet the preset depth condition can be determined from the P peak points and Q trough points. For example, if most of the depth distances of the P peak points and the Q trough points are within a depth distance interval, and there is a small number of peak points and/or trough points whose depth distances are not within the depth distance interval, it is believed that that the small number of peak points and/or trough points may be abnormal points caused by other interference factors. In other words, it is believed that that the abnormal point is not the corresponding mark point of the electrode plate, and cannot be used to reflect the arrangement and setting of the electrode plates in the battery. The target peak point can be the peak point except the abnormal point among the P peak points, and the target trough point can be the trough point except the abnormal point among the Q trough points.

For example, the depth distances of most of the P peak points and the Q trough points are within the interval of [40, 60]. However, in the P peak points and the Q trough points, if there is a peak point a with a depth distance of 10 or a trough point b with a depth distance of 80, the peak point a and the trough point b can be determined as abnormal points, in other words, the peak point and the trough point except the peak point a and the trough b in the P peak points and Q trough points can be determined as the target peak point and the target trough point.

The alignment detection result of the battery electrode plates can be determined based on the position information of the target peak point and the target trough point.

In this embodiment, the abnormal points among the P peak points and Q trough points can be filtered out first, and the alignment detection result of the battery electrode plates can be determined based on the position information of the target peak points and the target trough points obtained after filtering, which can further improve the accuracy of the alignment detection result of the battery electrode plates.

In some embodiments, determining the target peak point and the target trough point whose depth distances meet the preset depth condition among the P peak points and the Q trough points described above may include the following steps:

determining the target peak point among the P peak points, the depth distance of the target peak point is in a first depth distance interval;

determining the target trough point among the Q trough points, the depth distance of the target trough point is in a second depth distance interval, a minimum value of the second depth distance interval is greater than a maximum value of the first depth distance interval.

In the present embodiment, the target peak point among the P peak points can be determined. As an example, a peak point among the P peak points whose depth distance is in a first depth distance interval can be determined as the target peak point, wherein the first depth distance interval can be determined jointly based on the depth distances of the P peak points. For example, a first average value of the depth distances of the P peak points can be calculated first, the first depth distance interval is such an interval that the absolute value of the difference between the first average value and the value in the interval is less than a preset first value. The first depth distance interval can also be set according to an empirical value in connection with actual situations, which is not specifically limited here.

The target trough point in the Q trough points can be determined. A an example, a trough point among the Q trough points whose depth distance is in a second depth distance interval can be determined as the target trough point, wherein the second depth distance interval can be determined jointly based on the depth distances of the Q trough points. For example, a second average value of the depth distances of the Q trough points can be calculated first, the second depth distance interval is such an interval that the absolute value of the difference between the second average value and the value in the interval is less than a preset second value. The second depth distance interval can also be set according to an empirical value in connection with actual situations, which is not specifically limited here.

It should be understood that the minimum value of the second depth distance interval may be greater than the maximum value of the first depth distance interval, so that the same mark point may not only be, the preset first value and the preset second value described above may the same or different values, which is not specifically limited here.

In this embodiment, the abnormal peak points among the P peak points and the abnormal trough points among the Q trough points can be filtered out respectively, thereby ensuring the accuracy of filtering the abnormal points, and more accurate target peak point and target trough point can be obtained, so that when the alignment detection result of the battery electrode plates is determined based on the position information of the target peak point and the target trough point, the accuracy can be further improved.

In some embodiments, determining the alignment detection result of the battery electrode plates based on the position information of the P peak points and the Q trough points described above may include the following steps:

determining whether the P peak points and the Q trough points are arranged according to a preset rule based on the position information of the P peak points and the Q trough points; and determining that the alignment detection result of the battery electrode plates is qualified under a condition that the P peak points and the Q trough points are arranged according to the preset rule.

In the present embodiment, whether the P peak points and the Q trough points are arranged according to the preset rule can be determined based on the position information of the P peak points and the Q trough points, wherein the preset rule can be that the P peak points and the Q trough points are arranged in a staggered manner.

In the case that the P peak points and the Q trough points are arranged in a staggered manner, it's believed that the positive electrode plate among the battery electrode plates completely covers the negative electrode plates, which can meet the requirements of safety performance, so it can be determined that the alignment detection result of the battery electrode is qualified.

In this embodiment, the alignment detection result of the battery electrode plates can be determined more intuitively and quickly according to whether the P peak points and Q trough points are arranged according to the preset rule, which effectively improves the efficiency of the alignment detection while ensuring the accuracy.

In some embodiments, determining that the alignment detection result of the battery electrode plates is qualified under the condition that the P peak points and the Q trough points are arranged according to the preset rule described above may include the following steps:

under the condition that the P peak points and the Q trough points are arranged according to the preset rule, determining whether the P peak points and the Q trough points meet a preset offset condition based on the depth distances of the P peak points and the Q trough points; and under a condition that the P peak points and the Q trough points meet the preset offset condition, determining that the alignment detection result of the battery electrode plates is qualified.

In this embodiment, in order to improve the accuracy of the alignment detection result of the battery electrode plates, under the condition that the P peak points and the Q trough points are arranged according to the preset rule, whether the P peak points and the Q trough points meet a preset offset condition may be determined based on the depth distances of the P peak points and the Q trough points.

For example, from the depth distances of the P peak points and the Q trough points, a maximum depth distance and a minimum depth distance can be determined, and the difference between the maximum depth distance and the minimum depth distance can be calculated. If the difference is less than or equal to the preset offset threshold, it's believed that the P peak points and the Q trough points meet the preset offset condition. If the difference is greater than the preset offset threshold, it's believed that the P peak points and the Q trough points do not meet the preset offset condition.

Under the condition that the P peak points and the Q trough points meet the preset offset condition, it is determined that the alignment detection result of the battery electrode plates is qualified. For example, if the P peak points and Q trough points meet the preset offset condition, it can be considered that the positive and negative electrode plates are neatly arranged in the process of lamination, then the alignment detection result of the battery electrode plates can be considered to be qualified. If the P peak points and the Q trough points do not meet the preset offset condition, it can be considered that although the positive electrode plate among the battery electrode plates completely covers the negative electrode plates, the uniformity of the arrangement of positive and negative electrode plates is poor, which may have a certain impact on the electrical performance of the battery electrode plates, so it can be considered that the alignment detection result of the battery electrode plates is not qualified.

In this embodiment, the alignment detection result of the battery electrode plates can be determined from two dimensions, one is to consider the safety performance of the battery electrode plates to determine whether the positive electrode plate completely covers the negative electrode plates; and the other is to consider the electrical performance of the battery electrode plates based on the uniformity of the positive and negative electrode plates, which further improves the accuracy of the alignment detection result, so that the good product rate of the battery manufactured subsequently based on the qualified battery electrode plates is higher.

In some embodiments, under the condition that the P peak points and the Q trough points are arranged according to the preset rule, determining whether the P peak points and the Q trough points meet the preset offset condition based on the depth distances of the P peak points and the Q trough points described above may include the following steps:

under the condition that the P peak points and the Q trough points are arranged according to the preset rule, obtaining an offset amount of the depth distances between the mark point corresponding to an i-th electrode plate and the mark point corresponding to a (i+1)th electrode plate, wherein i is a positive integer; and under a condition that the offset amount is in a preset offset interval, determining that the P peaks points and the Q trough points meet the preset offset condition.

In this embodiment, in order to determine whether the P peak points and the Q trough points meet the preset offset condition, the offset amount of the depth distances between the mark point corresponding to the i-th electrode plate and the mark point corresponding to the (i+1)th electrode plate can be obtained. In other words, the difference between the depth distances of any two adjacent mark points among the N mark points can be obtained and determined as the offset amount of the two mark points. It can be determined that the P peak points and Q trough points meet the preset offset condition when all the offset amounts are in the preset offset interval.

The preset offset interval can be determined based on the off amounts of the depth distances between all two adjacent mark points in the battery electrode plates. For example, the average offset amount can be calculated first, the preset off interval is such an interval that the absolute value of the difference between the average offset amount and the value in the interval is less than a preset value. The preset offset interval can also be set according to an empirical value in connection with actual situations, which is not specifically limited here.

For example, the "offset amount 1" of the depth distances between the first mark point and the second mark point can be obtained, and the "offset amount 2" of the depth distances between the second mark point and the third mark point can be obtained, . . . , the "offset amount N-1" of the depth distances between the N-1 mark point and the N mark point can be obtained. It's believed that P peak points and Q trough points satisfy the preset offset condition when the "offset amount 1", the "offset amount 2", . . . , the "offset amount N-1" are all in the preset offset interval.

In this embodiment, by determining whether the offset amount of the depth distances between the mark point corresponding to the i-th electrode plate in the battery electrode plates and the mark point corresponding to the (i+1)th electrode plate is in the preset offset interval respectively, and then determining whether the P peak points and Q trough points meet the preset offset condition, the uniformity factor of the positive and negative electrode plates can be more fully considered, and the accuracy of the alignment detection result can be further improved, therefore, the good product rate of the battery manufactured subsequently based on the qualified battery electrode plates is higher.

In some embodiments, before determining the alignment detection result of the battery electrode plates based on the position information of the P peak points and the Q trough points described above, the method for detecting alignment of battery electrode plates may further include:

obtaining a peak line by fitting based on the position information of the P peak points;

calculating an inclination amount of the battery electrode plates based on the peak line;

determining that the alignment detection result of the battery electrode plates is qualified under the condition that the P peak points and the Q trough points are arranged according to the preset rule described above may include the following steps:

under a condition that the inclination amount is less than or equal to a preset threshold, and the P peak points and the Q trough points are arranged according to the preset rule, determining that the alignment detection result of the battery electrode plates is qualified.

In this embodiment, in order to further improve the accuracy of the alignment detection result of the battery electrode plates, the peak line may be obtained by fitting based on the position information of the P peak points; the inclination amount of the battery electrode plates may be calculated based on the peak line. If the inclination amount is less than or equal to a preset threshold, and the P peak points and Q trough points are arranged according to the preset rule, the alignment detection result of the battery electrode plates can be considered to be qualified.

If the inclination amount is greater than the preset threshold, it can be considered that the overall structure of the battery electrode plates is difficult to meet the subsequent manufacturing process, then it can be determined that the alignment detection result of the battery electrode plates is not qualified.

In this embodiment, the alignment detection result of the battery electrode plates can be determined from the two dimensions including the overall inclination of the battery electrode plates and whether the positive electrode plate completely covers the negative electrode plates, which can further improve the accuracy of the alignment detection result, thus the good product rate of the battery manufactured subsequently based on the qualified battery electrode plates is higher.

In some embodiments, the step 101 described above may include the following steps:

under a condition that lamination completion information of the battery electrode plates is received, controlling a photographing device to move along a first direction, and taking an image of the battery electrode plates, the first direction is parallel to the electrode plate setting direction of the battery electrode plates;

determining the depth distance of the target cross section of the battery electrode plates based on the image.

Figure 5:
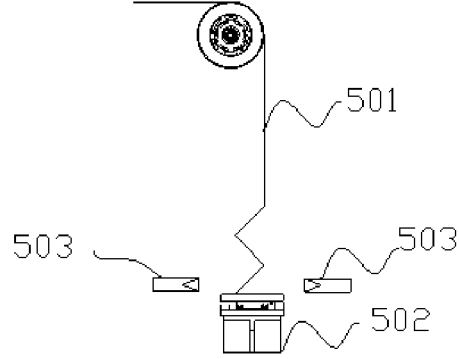
FIG. 5 is a principle schematic diagram of a lamination process provided by the embodiment of the present application.

Referring to FIG. 5, under the condition that the lamination completion information of the battery electrode plates 501 is received, a photographing device 503 can be controlled to move along the first direction and shooting an image of the battery electrode plates 501, wherein the first direction is parallel to the electrode plate setting direction of the battery electrode plates 501, which can be the length or width direction of the battery electrode plates, and the photographing device may be a depth camera.

For example, the battery electrode plates 501 are laminated on the lamination table 502, and a cutting device is arranged on the lamination table 502, and when an ending condition of the lamination process is satisfied, the cutting device will cut the positive electrode plate to complete the lamination process. Sensors can be installed on the cutting device, and it's believed the lamination is completed when the cutting device is cutting, and the sensor on the cutting device can send the information generated by the cutting to a programmable logic controller (PLC). The PLC generates the lamination completion information in response to the signal and sends the lamination completion information to an upper computer. At this time, the PLC can control the depth camera to have servo movement along the length or width direction of the battery electrode plates. At the same time, the upper computer controls the depth camera to take pictures and shoot the side characteristics of the battery electrode plates to obtain the image of the battery electrode plates.

3D point cloud image data can be formed according to the image, and then the depth distances of the target cross section of the battery electrode plates can be determined according to the 3D point cloud image data.

In this embodiment, when the lamination completion information of the battery electrode plates is received, the photographing device can be controlled to capture the image of the battery electrode plates, and the depth distances of the target cross section of the battery electrode plates can be obtained, and then the alignment of the battery electrode plates can be detected according to the depth distances of the target cross section. The automation of the alignment detection of the battery electrode plates after lamination molding is realized, the detection process is simplified, and the detection efficiency is effectively improved.

Figure 6:
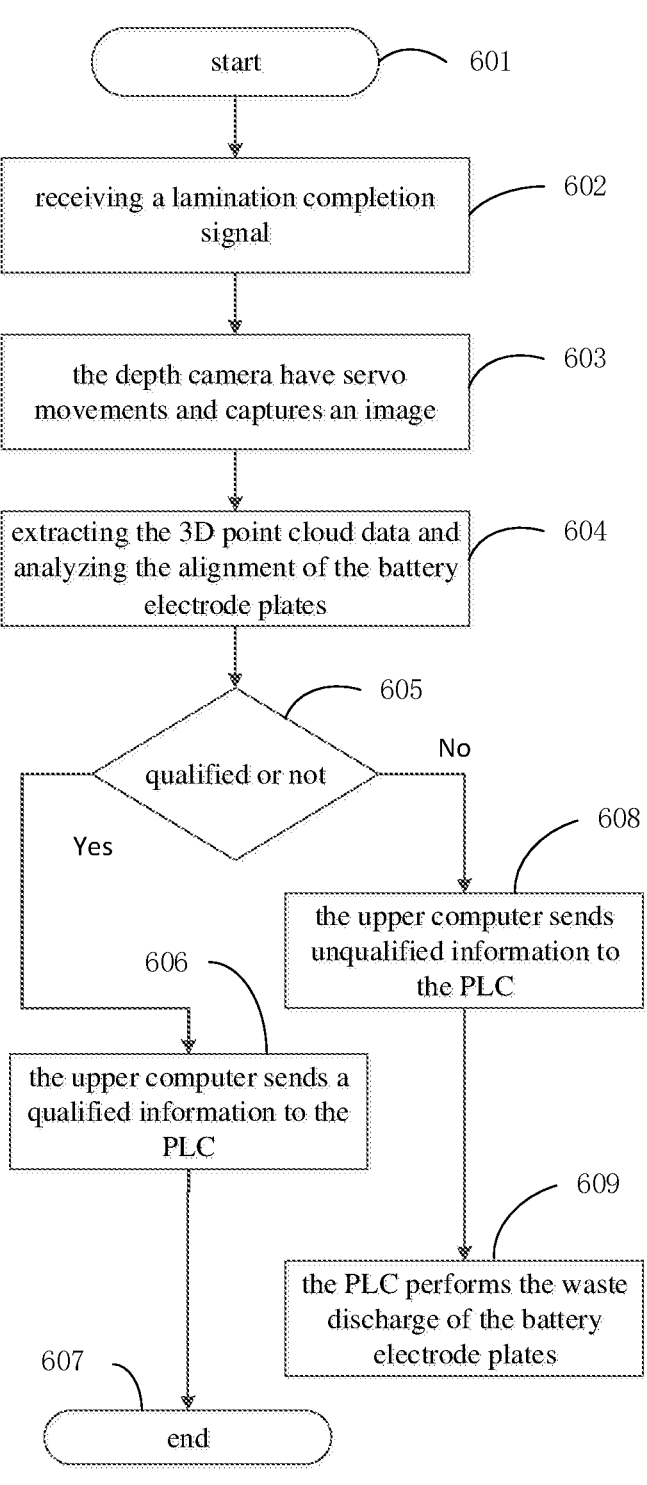
FIG. 6 is a schematic diagram of a scenario embodiment of the method for detecting alignment of battery electrode plates provided by the embodiment of the present application.

In order to facilitate the understanding of the method for detecting alignment of battery electrode plates provided by the above embodiments, the above method for detecting alignment of battery electrode plates is illustrated with a specific scenario embodiment below. FIG. 6 illustrates a schematic diagram of a scenario embodiment for the above method for detecting alignment of battery electrode plates.

As shown in FIG. 6, the scenario embodiment includes the following steps.

In step 601, starting the process.

In step 602, receiving a lamination completion signal. For example, after the lamination action for the battery electrode plates currently on the lamination station is completed, the upper computer can receive the lamination completion signal sent by the PLC.

In step 603, the depth camera have servo movements and captures an image. For example, the PLC can control the depth camera to have servo movements along the length or width direction of the battery electrode plates, while the upper computer controls the depth camera to start to take pictures and shoot the side characteristics of the battery electrode plates to obtain the image of the battery electrode plates.

In step 604, extracting the 3D point cloud data and analyzing the alignment of the battery electrode plates. For example, after the shooting is finished, the 3D point cloud image data can be extracted from the image of the battery electrode plates. Based on the 3D point cloud image data, the overall offset amount of the battery electrode plates can be analyzed by image processing and the inclination amount of the battery electrode plates can also be analyzed, then the alignment detection result of the battery electrode plates can be determined.

In Step 605, determining whether the alignment detection result of the battery electrode plates is qualified, if so, step 606 is performed, if not, step 608 is performed.

In step 606, the upper computer sends a qualified information to the PLC so that the PLC can perform the follow-up operations for the qualified battery electrodes, so as to produce a battery with a higher good product rate.

In Step 607, ending the process.

In Step 608, the upper computer sends unqualified information to the PLC.

In Step 609, the PLC controls the corresponding mechanism to perform the waste discharge of the battery electrode plates.

In this scenario embodiment, the image of the battery electrode plates after lamination molding can be captured by the depth camera, and the overall alignment of the battery electrode plates can be determined according to the 3D point cloud image data extracted from the image. The battery electrode plates qualified in the detection may be used to perform a subsequent manufacturing process, and the battery electrode plates unqualified in the detection can be treated by waste discharge, so as to ensure the quality of the battery and improve the good product rate of the battery.

Based on the method for detecting alignment of battery electrode plates provided by the above embodiments, the present application also provides an embodiment of an apparatus for detecting alignment of battery electrode plates.

Figures 7, 8:
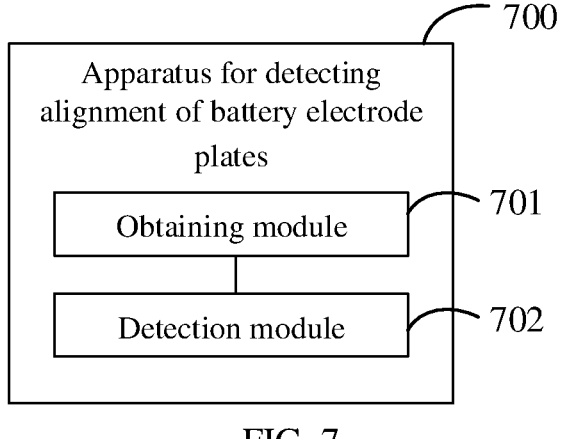
FIG. 7 is a structure schematic diagram of an apparatus for detecting alignment of battery electrode plates provided by another embodiment of the present application.
FIG. 8 is a structure schematic diagram of an electronic device provided by yet another embodiment of the present application.

FIG. 7 is a structure schematic diagram of the apparatus for detecting alignment of battery electrode plates provided by another embodiment of the present application, and for ease of illustration, only the parts related to the embodiment of the present application are shown.

Referring to FIG. 7, the apparatus 700 for detecting alignment of battery electrode plates may include:

an obtaining module 701 for obtaining depth distances of a target cross section of the battery electrode plates after lamination molding, wherein the target cross section is perpendicular to an electrode plate setting direction of the battery electrode plates, and the depth distances of the target cross section includes the depth distance corresponding to each of the electrode plates;

a detection module 702 for determining an alignment detection result of the battery electrode plates based on the depth distances of the target cross section.

In this embodiment, the apparatus for detecting alignment of battery electrode plates may obtain the depth distances of the target cross section of the battery electrode plates after lamination molding of the battery electrode plates. Since the target cross section is perpendicular to the electrode plate setting direction of the battery electrode plates, the target cross section includes each of the battery electrode plates. The depth distances of the target cross section may include the corresponding depth distance of each electrode plate. According to the corresponding depth distance of each electrode plate, the overall alignment of the battery electrode plates after lamination molding can be determined. The battery electrode plate qualified in the detection may be used to perform a subsequent manufacturing process, and the battery electrode plate failed in the detection can be treated by waste discharge, so as to ensure the quality of the battery and improve the good product rate of batteries.

In some embodiments, the detection module 702 may include:

a first determination unit for based on the depth distances of N mark points included in the target cross section, determining peak points and trough points among the N mark points to obtain P peak points and Q trough points, wherein the N mark points correspond to N electrode plates one to one, wherein N is an integer greater than 1, and P and Q are both positive integers; and a second determination unit for determining the alignment detection result of the battery electrode plates based on position information of the P peak points and the Q trough points.

In this embodiment, the peak points and the trough points among the battery electrode plates can be determined based on the depth distances of the N mark points, and then the arrangement and setting of each of the battery electrode plates can be reflected more intuitively according to the position information of the peak points and the trough points, thus the alignment detection result of the battery electrode plates can be determined more quickly and accurately.

In some embodiments, the first determination unit is further for:

dividing the target cross section into M regions, wherein each of the M regions includes a mark point corresponding to at least one positive electrode plate and a mark point corresponding to at least one negative electrode plate, respectively; and determining the peak point and the trough point in each of the M regions to obtain the P peak points and the Q trough points based on the depth distances of the mark points in each of the M regions.

In this embodiment, by dividing the target cross section into M regions, determining the peak point and the trough point in each region and then summarizing the peak points and the trough points in the M regions, to obtain the P peak points and the Q trough points of the battery electrode plates. On the one hand, region division can reduce the number of mark points in each region, which effectively reduces the difficulty of determining the peak points and trough points, and thus improving the efficiency of determining the peak points and trough points among the battery electrode plates. On the other hand, the region division can improve the influence of inclination of the battery electrode plate on the determination of the peak points and trough points, more accurately determine the peak points and trough points among the N mark points of the target cross section, and then ensure the accuracy of the subsequent alignment detection result of the battery electrode plates.

In some embodiments, the apparatus 700 for detecting alignment of battery electrode plates may further include:

a determination module for determining a target peak point and a target trough point whose depth distances meet a preset depth condition among the P peak points and the Q trough points;

the second determination unit is further for determining the alignment detection result of the battery electrode plates based on position information of the target peak point and the target trough point.

In this embodiment, the abnormal points among the P peak points and the Q trough points can be filtered out first, and the alignment detection result of the battery electrode plates can be determined based on the position information of the target peak point and the target trough point obtained after filtering, which can further improve the accuracy of the alignment detection result of the battery electrode plates.

In some embodiments, the determination module is further for:

determining the target peak point among the P peak points, the depth distance of the target peak point is in a first depth distance interval; and determining the target trough point among the Q trough points, the depth distance of the target trough point is in a second depth distance interval, a minimum value of the second depth distance interval is greater than a maximum value of the first depth distance interval.

In this embodiment, the abnormal peak points among the P peak points and the abnormal trough points among the Q trough points can be filtered out respectively, thereby ensuring the accuracy of filtering the abnormal points, and more accurate target peak points and target trough points can be obtained, so that when the alignment detection result of the battery electrode plates is determined based on the position information of the target peak points and the target trough points, the accuracy can be further improved.

In some embodiments, the second determination unit may include:

a first determination subunit for determining whether the P peak points and the Q trough points are arranged according to a preset rule based on the position information of the P peak points and the Q trough points, and a second determination subunit for determining that the alignment detection result of the battery electrode plates is qualified under a condition that the P peak points and the Q trough points are arranged according to the preset rule.

In this embodiment, the alignment detection result of the battery electrode plates can be determined more intuitively and quickly based on whether the P peak points and Q trough points are arranged according to the preset rule, which effectively improves the efficiency of the alignment detection while ensuring the accuracy.

In some embodiments, the second determination subunit is further for:

under the condition that the P peak points and the Q trough points are arranged according to the preset rule, determining whether the P peak points and the Q trough points meet a preset offset condition based on the depth distances of the P peak points and the Q trough points, and under a condition that the P peak points and the Q trough points meet the preset offset condition, determining that the alignment detection result of the battery electrode plates is qualified.

In this embodiment, the alignment detection result of the battery electrode plates can be determined from two dimensions, one is to consider the safety performance of the battery electrode plates to determine whether the positive electrode plate completely covers the negative electrode plates; and the other is to consider the electrical performance of the battery electrode plates based on the uniformity of the positive and negative plates, which further improves the accuracy of the alignment detection result, so that the good product rate of the battery manufactured subsequently based on the qualified battery electrode plates is higher.

In some embodiments, the second determination subunit is further for:

under the condition that the P peak points and the Q trough points are arranged according to the preset rule, obtaining an offset amount of the depth distances between the mark point corresponding to an i-th electrode plate and the mark point corresponding to a (i+1)th electrode plate, wherein i is a positive integer; and under a condition that the offset amount is in a preset offset interval, determining that the P peaks points and the Q trough points meet the preset offset condition.

In this embodiment, by determining whether the offset amount of the depth distances between the mark point corresponding to the i-th electrode plate in the battery electrode plates and the mark point corresponding to the (i+1)th electrode plate is in the preset offset interval respectively, and then determining whether the P peak points and Q trough points meet the preset offset condition, the uniformity factor of the positive and negative plates can be more fully considered, and the accuracy of the alignment detection result can be further improved, therefore, the good product rate of the battery manufactured subsequently based on the qualified battery electrode plates is higher.

In some embodiments, the apparatus 700 for detecting alignment of battery electrode plates further may further include:

a fitting module for obtaining a peak line by fitting based on the position information of the P peak points;

a calculation module for calculating an inclination amount of the battery electrode plates based on the peak line;

the second determination subunit is further for:

under a condition that the inclination amount is less than or equal to a preset threshold, and the P peak points and the Q trough points are arranged according to the preset rule, determining that the alignment detection result of the battery electrode plates is qualified.

In this embodiment, the alignment detection result of the battery electrode plates can be determined from the two dimensions including the overall inclination of the battery electrode plates and whether the positive electrode plate completely covers the negative electrode plates, which can further improve the accuracy of the alignment detection result, thus the good product rate of the battery manufactured subsequently based on the qualified battery electrode plates is higher.

In some embodiments, the obtaining module is further for:

under a condition that lamination completion information of the battery electrode plates is received, controlling a photographing device to move along a first direction, and taking an image of the battery electrode plates, the first direction is parallel to the electrode plate setting direction of the battery electrode plates;

determining the depth distance of the target cross section of the battery electrode plates based on the image.

In this embodiment, when the lamination completion information of the battery electrode plates is received, the photographing device can be controlled to capture the image of the battery electrode plates, and the depth distances of the target cross section of the battery electrode plates can be obtained, and then the alignment of the battery electrode plates can be detected according to the depth distances of the target cross section. The automation of the alignment detection of the battery electrode plates after lamination molding is realized, the detection process is simplified, and the detection efficiency is effectively improved.

It should be noted that the information exchange and execution process between the above-mentioned apparatuses/units are based on the same idea as the method embodiment of the present application, and the above-mentioned apparatuses/units are the devices corresponding to the above-mentioned method for detecting alignment of battery electrode plates. All the implementations in the above method embodiments are applicable to the apparatus embodiments, and the specific functions and technical effects can be found in the method embodiment section, which will not be repeated here.

The skilled in the art can clearly understand that for the convenience and brevity of the description, only the division of the above-mentioned functional units and modules is illustrated by examples. In practical application, the above functions can be assigned to different functional units and modules for implementation according to needs, that is, the internal structure of the apparatus is divided into different functional units or modules to complete all or part of the functions described above. Various functional units and modules in the embodiments can be integrated in one processing unit, or each unit can exist on its own physically, or two or more units can be integrated into one unit. The integrated unit can be realized in the form of either hardware or software function unit. In addition, the specific names of each functional unit and module are only for the purpose of distinguishing from each other, and are not used to limit the scope of protection of the present application. The specific working process of the units and modules in the above system can be referred to the corresponding process in the above-mentioned method embodiments, which will not be repeated here.

FIG. 8 illustrates a schematic diagram of a hardware structure of an electronic device provided by yet another embodiment of the present application. The electronic device may include a processor 801 and a memory 802 storing programs or instructions. The processor 801, when executes the programs, implements the steps in any of the method embodiments described above.

As an example, the programs may be divided into one or more modules/units, and the one or more modules/units are stored in the memory 802 and executed by the processor 801 to implement the present application. The one or more modules/units may be a series of program instruction segments capable of performing specific functions, which are used to describe the execution of the program in the apparatus.

Specifically, the above processor 801 may include a central processing unit (CPU), or a specific integrated circuit (ASIC), or may be configured to implement one or more integrated circuits according to the embodiments of the present application.

The memory 802 may include a large-capacity memory for data or instructions. For example rather limitation, the memory 802 may include a hard disk drive (HDD), a floppy disk drive, a flash memory, an optical disk, a magneto-optical disk, a magnetic tape, or a Universal Serial Bus (USB) drive, or a combination of two or more thereof. Appropriately, the memory 802 may include removable or non-removable (or fixed) media. Appropriately, the memory 802 may be inside or outside of a comprehensive gateway disaster recovery device. In some embodiments, the memory 802 is a non-volatile solid-state memory.

The memory may include a read-only memory (ROM), a random access memory (RAM), a magnetic disk storage media device, an optical storage media device, a flash memory device, an electrical, optical, or other physical/tangible memory storage device. Therefore, generally, the memory includes one or more tangible (non-transitory) computer-readable storage media (e.g., memory devices) encoded with software including computer-executable instructions, and when the software is executed (e.g., by one or more processors), it is operable to perform the operations described with reference to the methods according to one aspect of the present application.

The processor 801 implements any of methods in the above embodiments by reading and executing the computer program instructions stored in the memory 802.

In an example, the electronic device may further include a communication interface 803 and a bus 804. The processor 801, the memory 802, and the communication interface 803 are connected and complete mutual communication through the bus 804.

The communication interface 803 may be mainly used to implement communications among various modules, apparatuses, units, and/or devices in the embodiments of the present application.

The bus 804 may include a hardware, a software, or both, and may couple the components of the device for billing online data flow to each other. By way of examples rather than limitation, the bus may include an Accelerated Graphics Port (AGP) or other graphics buses, an Enhanced Industry Standard Architecture (EISA) bus, a Front Side Bus (FSB), a Hypertransport (HT) interconnect, an Industry Standard Architecture (ISA) Bus, an infinite bandwidth interconnect, a Low Pin Count (LPC) bus, a memory bus, a Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus, or other suitable buses, or a combination of two or more of them. Where appropriate, the bus 804 may include one or more buses. Although specific buses are described and illustrated in the embodiments of the present application, the present application may contemplate any suitable bus or interconnect.

In addition, in combination with the methods in the above embodiments, the embodiments of the present application may provide a computer storage medium for implementation. The computer storage medium stores programs or instructions which, when executed by the processor, implement any of the methods in the above embodiments. The readable storage medium can be read by a machine such as a computer.

The present application embodiment also provides a chip, which includes a processor and a communication interface, the communication interface is coupled with the processor, and the processor is used to run programs or instructions to realize each process of the above method embodiments, and the same technical effects can be achieved. In order to avoid repetition, it will not be repeated here.

It should be understood that the chip mentioned in the embodiments of the present application may also be referred to as a system-level chip, a system chip, a chip system or a system-on-chip, etc.

The embodiments of the present application provides a computer program product stored in a readable storage medium, the program product is executed by at least one processor to implement for example each process of the above method embodiments, and can achieve the same technical effects, in order to avoid repetition, it will not be repeated here.

It should be noted that the present application is not limited to the specific configurations and processes described above and shown in the figures. For simplicity, a detailed descriptions of well-known methods are omitted herein. In the above embodiments, several specific steps are described and shown as examples. However, the flow of the methods of the present application is not limited to the specific steps described and shown, those skilled in the art can make various changes, modifications and additions, or change the order of the steps, after understanding the gist of the present application.

Functional blocks shown in the above structural diagrams may be implemented as hardware, software, firmware, or a combination thereof. When implemented in hardware, the functional blocks may be, for example, an electronic circuit, an Application Specific Integrated Circuit (ASIC), a suitable firmware, a plug-in, a function card and the like. When implemented in software, elements of the present disclosure may be programs or code segments used to perform the required tasks. The programs or code segments may be stored in a machine-readable medium or transmitted over a transmission medium or a communication link via data signals carried in carriers. The "machine-readable medium" may include any medium capable of storing or transmitting information. Examples of the machine-readable medium may include an electronic circuit, a semiconductor memory device, a ROM, a flash memory, an erasable ROM (EROM), a floppy disk, a CD-ROM, an optical disk, a hard disk, a fiber medium, a Radio Frequency (RF) link, and the like. The code segments may be downloaded via a computer network, for example, the Internet, an intranet, and the like.

It should be further noted that exemplary embodiments mentioned in the present application describe some methods or systems based on a series of steps or apparatuses. However, the present application is not limited to the above described order of the steps, that is, the steps may be executed in the order mentioned in embodiments, or an order different from that in the embodiments, or several steps may be executed simultaneously.

Various aspects of the present disclosure have been described above with reference to the flowcharts and/or block diagrams of the methods, apparatuses (systems), and program products according to the embodiments of the present disclosure. It should be understood that each block in the flowcharts and/or block diagrams and combinations of blocks in the flowcharts and/or block diagrams can be implemented by computer programs or instructions. These programs or instructions can be provided to a processor of a general-purpose computer, a special-purpose computer, or other programmable data processing device to produce a machine, so that the execution of these instructions via the processor of the computer or other programmable data processing device enables implementation of the functions/ actions specified in one or more blocks of the flowcharts and/or block diagrams. Such a processor can be, but is not limited to, a general-purpose processor, a dedicated processor, a special application processor, or a field programmable logic circuit. It can also be understood that each block in the block diagrams and/or flowcharts and the combination of the blocks of the block diagrams and/or flowcharts can also be implemented by dedicated hardware that performs the specified function or action, or can be implemented by a combination of dedicated hardware and computer instructions.

Although the present application has been described with reference to preferred embodiments, various modifications may be made thereto and components thereof may be replaced with their equivalents, without departing from the scope of the present application. In particular, as long as there is no structural conflict, various technical features mentioned in various embodiments can be combined in any manner. The present application is not limited to the specific embodiments disclosed herein, and instead, includes all the technical solutions that fall within the scope of the claims.

What is claimed is:

1. A method for detecting alignment of lamination molded battery electrode plates by an alignment detecting apparatus, wherein the alignment detecting apparatus comprises a light sensing device and a data processing device connected to the light sensing device, the method comprising:

obtaining, by the light sensing device, depth distances of a target cross section of the battery electrode plates, wherein the target cross section is perpendicular to an electrode plate setting direction of the battery electrode plates, and each of the depth distances of the target cross section is corresponding to one of the electrode plates; and determining, by the data processing device, an alignment detection result of the battery electrode plates based on the depth distances of the target cross section obtained by the light sensing device;

wherein determining the alignment detection result of the battery electrode plates based on the depth distances of the target cross section comprises:

based on depth distances of N mark points comprised in the target cross section, determining peak points and trough points among the N mark points, to obtain P peak points and Q trough points, wherein the N mark points correspond to N electrode plates one to one, N is an integer greater than 1, and P and Q are both positive integers; and determining the alignment detection result of the battery electrode plates based on position information of the P peak points and the Q trough points.

2. The method of claim 1, wherein determining the peak points and the trough points among the N mark points, to obtain the P peak points and the Q trough points based on the depth distances of the N mark points comprised in the target cross section comprises:

dividing the target cross section into M regions, wherein each of the M regions comprises a mark point corresponding to at least one positive electrode plate and a mark point corresponding to at least one negative electrode plate, respectively; and determining the peak point and the trough point in each of the M regions to obtain the P peak points and the Q trough points based on the depth distances of the mark points in each of the M regions.

3. The method of claim 1, wherein after determining the peak points and the trough points among the N mark points, to obtain P peak points and Q trough points based on the depth distances of the N mark points comprised in the target cross section, the method further comprises:

determining a target peak point and a target trough point whose depth distance meets a preset depth condition among the P peak points and the Q trough points; and wherein determining the alignment detection result of the battery electrode plates based on the position information of the P peak points and the Q trough points comprises:

determining the alignment detection result of the battery electrode plates based on position information of the target peak point and the target trough point.

4. The method of claim 3, wherein determining the target peak point and the target trough point whose depth distances meet the preset depth condition among the P peak points and the Q trough points comprises:

determining the target peak point among the P peak points, the depth distance of the target peak point being in a first depth distance interval; and determining the target trough point among the Q trough points, the depth distance of the target trough point being in a second depth distance interval, a minimum value of the second depth distance interval being greater than a maximum value of the first depth distance interval.

5. The method of claim 1, wherein determining the alignment detection result of the battery electrode plates based on the position information of the P peak points and the Q trough points comprises:

determining whether the P peak points and the Q trough points are arranged according to a preset rule based on the position information of the P peak points and the Q trough points; and determining that the alignment detection result of the battery electrode plates is qualified under a condition that the P peak points and the Q trough points are arranged according to the preset rule.

6. The method of claim 5, wherein determining that the alignment detection result of the battery electrode plates is qualified under the condition that the P peak points and the Q trough points are arranged according to the preset rule comprises:

under the condition that the P peak points and the Q trough points are arranged according to the preset rule, determining whether the P peak points and the Q trough points meet a preset offset condition based on the depth distances of the P peak points and the Q trough points; and under a condition that the P peak points and the Q trough points meet the preset offset condition, determining that the alignment detection result of the battery electrode plates is qualified.

7. The method of claim 6, wherein under the condition that the P peak points and the Q trough points are arranged according to the preset rule, determining whether the P peak points and the Q trough points meet the preset offset condition based on the depth distances of the P peak points and the Q trough points comprises:

under the condition that the P peak points and the Q trough points are arranged according to the preset rule, obtaining an offset amount of the depth distances between the mark point corresponding to an i-th electrode plate and the mark point corresponding to a (i+1)th electrode plate, wherein i is a positive integer; and under a condition that the offset amount is in a preset offset interval, determining that the P peaks points and the Q trough points meet the preset offset condition.

8. The method of claim 5, wherein before determining the alignment detection result of the battery electrode plates based on the position information of the P peak points and the Q trough points, the method further comprises:

obtaining a peak line by fitting based on the position information of the P peak points; and calculating an inclination amount of the battery electrode plates based on the peak line; wherein under the condition that the P peak points and the Q trough points are arranged according to the preset rule, determining that the alignment detection result of the battery electrode plates is qualified comprises:

under a condition that the inclination amount is less than or equal to a preset threshold, and the P peak points and the Q trough points are arranged according to the preset rule, determining that the alignment detection result of the battery electrode plates is qualified.

9. The method of claim 1, wherein obtaining the depth distances of the target cross section of the battery electrode plates comprises:

under a condition that lamination completion information of the battery electrode plates is received, controlling a photographing device to move along a first direction, and taking an image of the battery electrode plates, the first direction being parallel to the electrode plate setting direction of the battery electrode plates; and determining the depth distance of the target cross section of the battery electrode plates based on the image.

10. The method according to claim 1, wherein the light sensing device comprises a photo sensor or a photographing device;

the data processing device comprises a processor and a memory coupled with the processor; and the memory is configured to store program instructions for execution by the processor.

11. An apparatus for detecting alignment of lamination molded battery electrode plates, comprising:

a light sensing device, and a data processing device connected to the light sensing device;

wherein the light sensing device is configured to obtain depth distances of a target cross section of the battery electrode plates, wherein the target cross section is perpendicular to an electrode plate setting direction of the battery electrode plates, and each of the depth distances of the target cross section is corresponding to one of the electrode plates; and wherein the data processing device is configured to determine an alignment detection result of the battery electrode plates based on the depth distances of the target cross section obtained by the light sensing device;

wherein in determining the alignment detection result of the battery electrode plates based on the depth distances of the target cross section, the data processing device is configured to:

based on the depth distances of N mark points comprised in the target cross section, determine peak points and trough points among the N mark points to obtain P peak points and Q trough points, wherein the N mark points correspond to N electrode plates one to one, N is an integer greater than 1, and P and Q are both positive integers; and determine the alignment detection result of the battery electrode plates based on position information of the P peak points and the Q trough points.

12. The apparatus of claim 11, wherein in determining the peak points and the trough points among the N mark points, to obtain the P peak points and the Q trough points based on the depth distances of the N mark points comprised in the target cross section, the data processing device is configured to:

divide the target cross section into M regions, wherein each of the M regions comprises a mark point corresponding to at least one positive electrode plate and a mark point corresponding to at least one negative electrode plate, respectively; and determine the peak point and the trough point in each of the M regions to obtain the P peak points and the Q trough points based on the depth distances of the mark points in each of the M regions.

13. The apparatus of claim 11, wherein after determining the peak points and the trough points among the N mark points, to obtain P peak points and Q trough points based on the depth distances of the N mark points comprised in the target cross section, the data processing device is further configured to:

determine a target peak point and a target trough point whose depth distances meet a preset depth condition among the P peak points and the Q trough points, and wherein in determining the alignment detection result of the battery electrode plates based on the position information of the P peak points and the Q trough points, the data processing device is configured to:

determine the alignment detection result of the battery electrode plates based on position information of the target peak point and the target trough point.

14. The apparatus of claim 13, wherein in determining the target peak point and the target trough point whose depth distances meet the preset depth condition among the P peak points and the Q trough points, the data processing device is configured to:

determine the target peak point among the P peak points, the depth distance of the target peak point being in a first depth distance interval; and determine the target trough point among the Q trough points, the depth distance of the target trough point being in a second depth distance interval, a minimum value of the second depth distance interval being greater than a maximum value of the first depth distance interval.

15. The apparatus of claim 11, wherein in determining the alignment detection result of the battery electrode plates based on the position information of the P peak points and the Q trough points, the data processing device is configured to:

determine whether the P peak points and the Q trough points are arranged according to a preset rule based on the position information of the P peak points and the Q trough points; and determine that the alignment detection result of the battery electrode plates is qualified under a condition that the P peak points and the Q trough points are arranged according to the preset rule.

16. The apparatus of claim 15, wherein in determining that the alignment detection result of the battery electrode plates is qualified under the condition that the P peak points and the Q trough points are arranged according to the preset rule, the data processing device is configured to:

under the condition that the P peak points and the Q trough points are arranged according to the preset rule, determine whether the P peak points and the Q trough points meet a preset offset condition based on the depth distances of the P peak points and the Q trough points; and under a condition that the P peak points and the Q trough points meet the preset offset condition, determine that the alignment detection result of the battery electrode plates is qualified.

17. The apparatus of claim 16, wherein under the condition that the P peak points and the Q trough points are arranged according to the preset rule, in determining whether the P peak points and the Q trough points meet the preset offset condition based on the depth distances of the P peak points and the Q trough points, the data processing device is configured to:

under the condition that the P peak points and the Q trough points are arranged according to the preset rule, obtain an offset amount of the depth distances between the mark point corresponding to an i-th electrode plate and the mark point corresponding to a (i+1)th electrode plate, wherein i is a positive integer; and under a condition that the offset amount is in a preset offset interval, determine that the P peaks points and the Q trough points meet the preset offset condition.

18. The apparatus of claim 15, wherein before determining the alignment detection result of the battery electrode plates based on the position information of the P peak points and the Q trough points, the data processing device is further configured to:

obtain a peak line by fitting based on the position information of the P peak points; and calculate an inclination amount of the battery electrode plates based on the peak line; and wherein under the condition that the P peak points and the Q trough points are arranged according to the preset rule, in determining that the alignment detection result of the battery electrode plates is qualified, the data processing device is configured to:

under a condition that the inclination amount is less than or equal to a preset threshold, and the P peak points and the Q trough points are arranged according to the preset rule, determine that the alignment detection result of the battery electrode plates is qualified.

19. The apparatus of claim 11, wherein in obtaining the depth distances of the target cross section of the battery electrode plates, the light sensing device is configured to:

under a condition that lamination completion information of the battery electrode plates is received, control a photographing device to move along a first direction, and taking an image of the battery electrode plates, the first direction being parallel to the electrode plate setting direction of the battery electrode plates; and determine the depth distance of the target cross section of the battery electrode plates based on the image.

20. The apparatus according to claim 11, wherein the light sensing device comprises a photo sensor or a photographing device;

the data processing device comprises a processor and a memory coupled with the processor; and the memory is configured to store program instructions for execution by the processor.

* * * * *